INVENTORS
GERALD R. PARKER
AMBROSE A VERDIBELLO

BY

ATTORNEY

United States Patent Office 3,478,255
Patented Nov. 11, 1969

3,478,255
PULSE AMPLITUDE DETECTION CIRCUIT
Gerald R. Parker, Longmont, Colo., and Ambrose A. Verdibello, Poughkeepsie, N.Y., assignors to International Business Machines Corporation, Armonk, N.Y., a corporation of New York
Filed Sept. 6, 1966, Ser. No. 577,210
Int. Cl. G11b 5/46
U.S. Cl. 320—1          6 Claims

ABSTRACT OF THE DISCLOSURE

This specification discloses apparatus for measuring the magnitudes of pulses such as those produced by a tape head reading information stored on a tape. The apparatus first compares the amplitude of the pulses with that of a desired reference level and then in a second comparison compares the result of the first comparison with the level of charge stored on a capacitor. Depending on the result of this second comparison the charge on the capacitor is either increased or decreased so that the potential across the capacitor is indicative of how the amplitudes of the pulses vary from the desired amplitude level.

---

The present invention relates to signal amplitude detection.

In the testing of magnetic tape used in computer applications, it is desirable to measure the amplitudes of pulses recorded on the tape to determine if they are within an acceptable range of a desired pulse level. This could be done with a peak detector which follows the peak amplitudes of the pulses and indicates if those peak amplitudes are within the range. However, the operation of such a detector is dependent on the absolute amplitudes and repetition rate of the pulses being measured. Such a dependency introduces errors especially where the pulses are recorded randomly on the magnetic tape.

Therefore, it is an object of the present invention to provide a new detection circuit.

It is a further object of the present invention to provide a detection circuit which supplies information concerning the magnitude of pulses which is independent of the magnitudes or repetition rate of the pulses.

In accordance with the present invention, a detector is provided which operates independently of the absolute amplitudes and repetition rate of the pulses being measured. This is accomplished by comparing the magnitude of each pulse with the desired level and using the resultant difference signal to determine if an increment of positive or negative charge should be applied to a storage capacitor. If at the occurrence of a pulse, the difference signal is more positive than the charge then on the capacitor an increment of positive charge is applied to the capacitor. On the other hand, if the difference signal is more negative than the charge on the capacitor an increment of negative charge is applied to the capacitor. However, if the difference pulse is equal to the charge on the capacitor, the charge on the capacitor is left unchanged. In this way the charge stored on the capacitor is adjusted so that it is an indication of how the magnitude of the pulses differ from the desired magnitude level.

The foregoing and other objects, features and advantages of the invention will be apparent from the following more particular description of a preferred embodiment of the invention as illustrated in the accompanying drawings of which:

Figure 1:
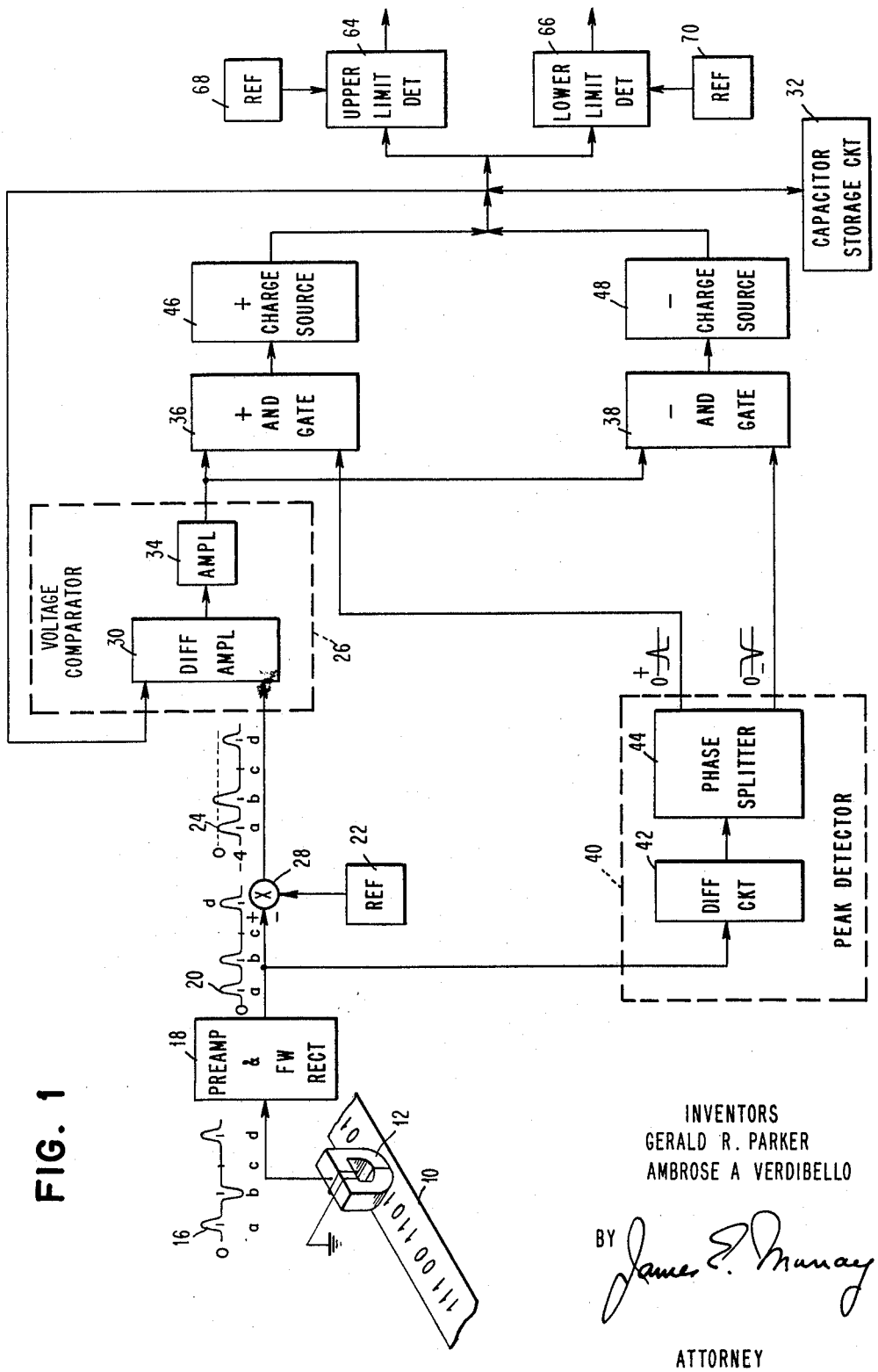
FIGURE 1 is a schematic representation of that embodiment.

Referring now to FIGURE 1, data in the form of stored ones and zeros is detected on tape 10 by tape head 12. The data is recorded on tape 10 by the NRZI "non return to zero IBM" method or by newer encoding methods such as phase encoding or modified FM, wherein the recording head magnetizes the tape in one polarity or the other. With the NRZI method, a 1-bit is recorded by reversing the current in the recording head so that the polarity of magnetization reverses at a given point whereas a 0-bit is recorded by continued magnetization in the same direction at a given point. Thus when reproducing information from tape a 1-bit is sensed by a change of flux whereas a 0-bit is sensed by the absence of a change of flux. Curve 16 represents information as it is detected on the tape 10 by the head 12. The pulses at $a$, $b$ and $d$ represent stored 1's and the absence of the pulse at $c$ represents a stored 0. The pulses are bipolar because they are produced by reversals in the polarity of saturated tape 12.

The information detected by the tape head 12 is fed into a combination preamplifier and full wave rectifier 18 where the data 16 is amplified and rectified to provide a series of pulses all of one polarity as is illustrated at 20. These rectified pulses are then compared with a reference voltage from a DC reference source 22 and the difference 24 is transmitted to a voltage comparator 26. The D.C. reference source 22 supplies a constant DC level which is subtracted from the output of the preamp 20 in a summing circuit 28. The output of the summing circuit 28 therefore is the information on the tape 10 referenced to some level other than zero. The reference level is chosen so that if a pulse is of the desired magnitude, the difference voltage 24 is zero, as is shown at $a$. Therefore, if a given pulse is larger than the desired magnitude the difference voltage 24 will be positive as shown at $b$ and if a given pulse is smaller than the desired magnitude, the difference voltage will be negative as shown at $d$. For purposes of illustration a negative four volt reference level was chosen. Therefore at times other than when there is a pulse at the output of the preamplifier 18, the voltage out of the summing circuit 28 will be a —4 volt.

In the voltage comparator 26, the output of the summing network 28 is fed into a differential amplifier 30 along with voltage stored in a capacitive storage circuit 32. These two voltages are compared by the differential amplifier and the result then fed into an amplifier 34. The output of the amplifier 34 is directly proportional to the difference between the magnitudes of the voltages out of the summing network 28 and capacitive storage circuit 32. Therefore, the amplifier's output will be zero if the voltage on the capacitive storage circuit 32 equals the voltage out of the summing network 28, will be positive if the voltage out of the summing network 28 is greater than the voltage on the capacitive storage circuit 32, and will be negative if the voltage out of the summing network 28 is less than the voltage on the capacitive storage circuit 32.

The voltage out of the voltage comparator circuit 26 is fed to both a +AND gate 36 and a —AND gate 38. Each of the AND gates 36 and 38 receives inputs from two sources. One of the sources is, of course, the output of the voltage comparator 26. The other of the sources is strobe signal which will be explained shortly. The coincident occurrence of a positive signal from each of the two sources on the inputs of the +AND gate 36 will cause the +AND gate 36 to provide an output and the coincident occurrence of a negative signal from each of the two sources on the —AND gate 38 will cause the —AND gate 38 to provide an output.

The strobe voltage mentioned previously is derived by taking the output of the preamp 22 and feeding it to a peak detector 40 which then provides a positive strobe gate to the +AND gate 36 and a negative strobe voltage to the —AND gate 38. In the peak detector 40 the output 20 of the preamp 18 is differentiated by a differentiating circuit 42 to produce a sharp strobe pulse whenever a pulse occurs at the output of the preamp 18 and otherwise provide a zero level output. The width of the pulses produced by the differentiating network 40 is determined by the time constant of the differentiating circuit 42. Therefore the pulses produced are all substantially the same width.

The pulses out of the differentiating circuit 42 are fed into a phase splitter 44 which provides a positive pulse to the +AND gate 36 and a negative pulse to the —AND gate 38 for each pulse produced by the differentiating circuit 42. At all other times the phase splitter 44 supplies a negative signal level to the +AND gate 36 and a positive signal level to the —AND gate 38. Therefore, the only time that either of the AND gates 36 and 38 can be enabled is when there is a pulse at the output of the preamp 18. At such times, a positive output from the voltage comparator 26 will gate the +AND gate 40 and a negative output from the voltage comparator 28 will gate the —AND gate. At all other times, the AND gates 36 and 38 are incapable of responding to the output voltage from the comparator 26 because of the lack of a proper signal to the AND gates 36 and 38 from the peak detector 40. For example, assume that the voltage on the capacitive storage circuit 32 is zero and the output 20 of the preamp is zero such as at c. Then the output of the voltage comparator 26 will be negative since the input to the differential amplifier 30 from the summing network 28 will be —4 volts while the input to the differential amplifier from the capacitive storage circuit 32 will be zero volts. This negative output is fed to both the +AND gate 36 and the —AND gate 38. However, neither gate is activated because of the lack of a strobe signal from the phase splitter 44.

The fact that there is a pulse at the output of the preamp 18 does not necessarily mean that either AND gate 36 or 38 will be gated on. For instance, assume that the charge on the capacitive storage circuit 32 is zero and the pulse provided is like that at a, then the peak detector 44 provides a positive gating pulse to the +AND gate 36 and the negative gate pulse to the —AND gate 38. However, the pulse at a is exactly equal in magnitude to the bias supplied by the reference 22. Thus, the output of the summing network 28 is zero and so is the output of the voltage comparator 28 since the difference between the output of the summing network 28 and the voltage in the capacitive storage circuit 32 is zero. Therefore neither AND gate 36 or 38 is enabled because of the lack of output from the voltage comparator 28 when the strobe pulses occur.

Figure 2:
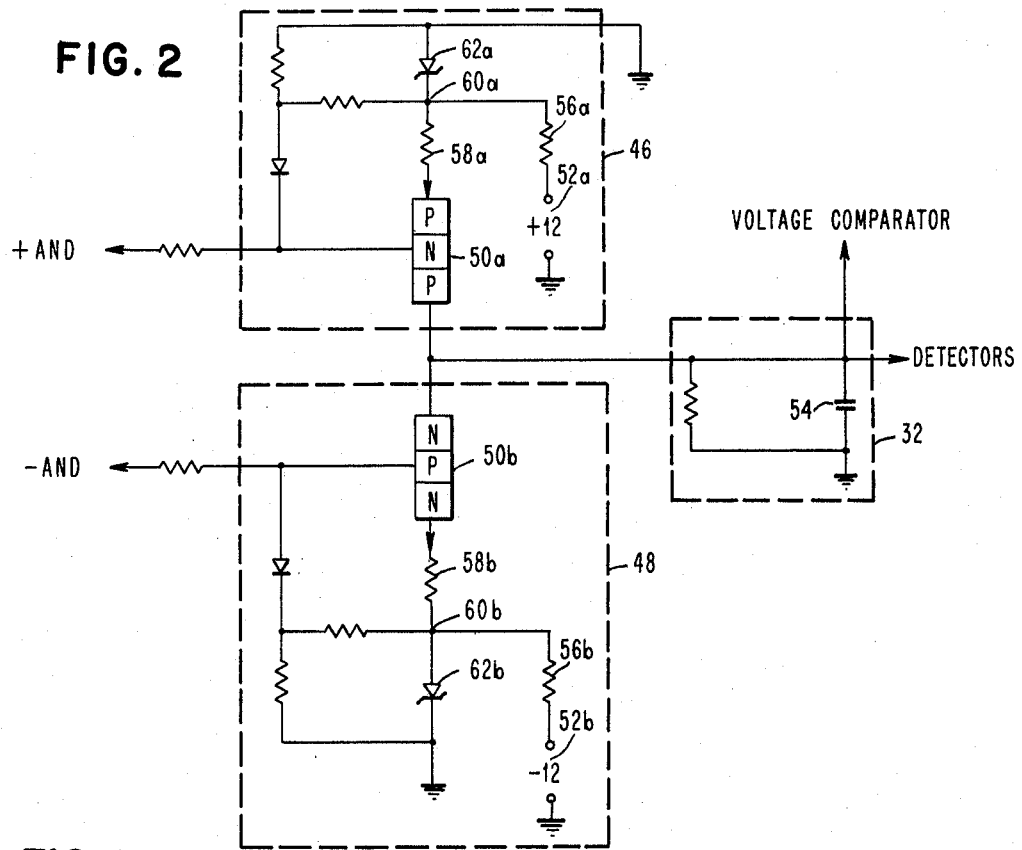
FIGURE 2 is an electrical schematic of the charging and discharging circuit for the embodiment.

When the +AND gate is gated on, an increment of positive charge from a positive charge source 46 is fed into the capacitive storage circuit 32. Likewise, when the —AND gate 38 is gated on, a negative increment of charge is fed from a negative charge source 48 into the capacitive storage circuit 32. As shown in FIGURE 2, each of the current sources 46 and 48 includes a transistor which controls the flow of current between DC supplies in the current sources and the storage element in the storage circuit 32.

In current source 46 transistor 50a controls the flow of current between 12 volt DC supply 52a and the capacitor 54 in the storage circuit 32, and in source 48 transistor 50b controls the current between 12 volt DC supply 52b and the capacitor 54. The positive terminal of the 12 volt DC supply 52a is connected to the emitter of transistor 50b by two serially connected resistors 56a and 58a whose common junction 60a is connected by a Zener diode 62a to ground. Likewise, the negative terminal of DC supply 52b is connected to the emitter of transistor 50b by two serially connected resistors 56b and 58b whose common junction 60b is connected to ground through Zener diode 62b. The resistors 58 regulate the current supplied by the DC supplies 52 while the Zener diodes 62 regulate the voltage from the supplies 52.

Transistors 50a and b are normally biased nonconductive by the voltage supplied to their bases by the AND gates 36 and 28 respectively to isolate the capacitor 54 from the sources 52a and b. However, when the +AND gate 36 is gated on, its output biases the transistor 50a conductive allowing current to flow from the source 52a through the capacitor 54. Likewise, when —AND gate 38 is gated on, its output biases the transistor 50b conductive allowing current to flow from source 52a to capacitor 54. Since either AND gate remains on only as long as there are two properly poled signals at its two inputs, charge supplied to the capacitor 54 by either of the AND gates 36 and 38 is dependent on the length of the input signals supplied to AND gates 36 and 38. Because of the differentiating circuit in the path of the strobe signal, the strobe pulses out of the peak detector 44 are shorter in duration than the pulses from the voltage comparator 26. Therefore, the length of these strobe pulses determines the length of time charge is supplied to the capacitor 54. Since as pointed out above all the strobe pulses are of the same length, the amount of charge applied to the capacitor 54 when either transistor 50a or b is gated on is exactly the same.

As pointed out previously, the charge on the capacitor is fed back to the voltage capacitor 26 and there compared in the differential amplifier 30 with the voltage out of the summing network 28. In addition, the voltage on the capacitor 54 is fed to an upper limit detector 64 and a lower limit detector 66 where the voltage is compared respectively against upper and lower limit references applied by reference sources 68 and 70. When the voltage on the capacitor exceeds either the upper limit reference or the lower limit reference, an error indication is supplied by the detectors 64 and 66. Otherwise, there is no indication from the detectors.

Figure 3:
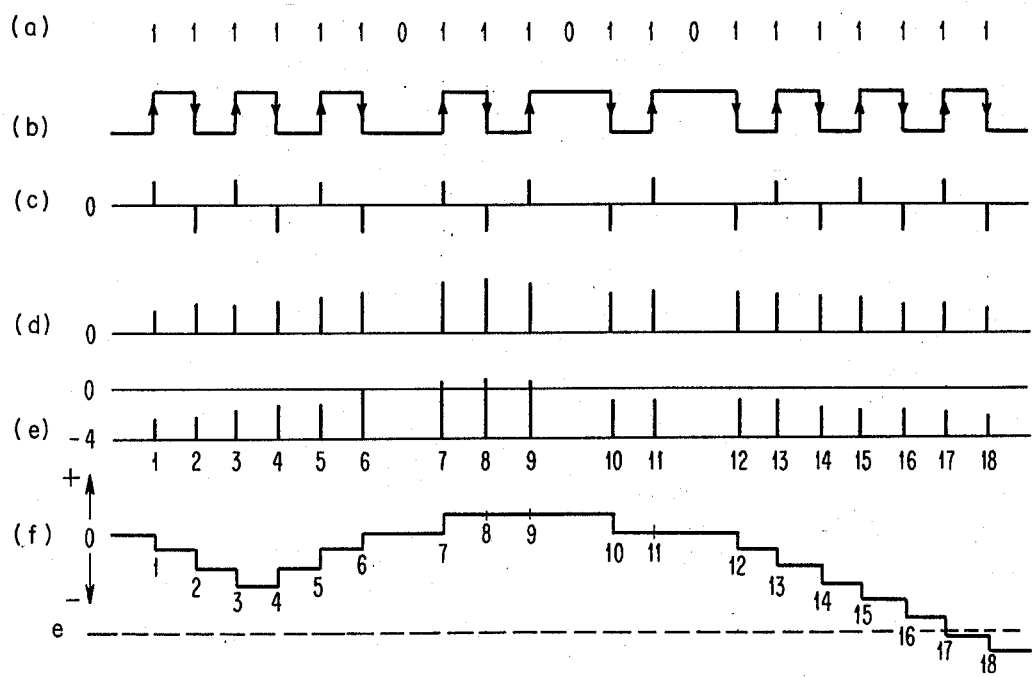
FIGURE 3 is a graph illustrating the operation of the embodiment shown in FIGURES 1 and 2.

The operation of the circuit of the described embodiment can be understood by reference to FIGURE 3. FIGURE 3a is representative of the ones and zeroes recorded on the tape 10. FIGURE 3b shows how tape is first magnetized in one direction and then in the other to record the ones and how the magnetization of the tape is unchanged when zeroes occur. Line c shows the output from the magnetic head 12 detecting the information on the tape 10. Notice how a pulse is produced by the head 12 to indicate the occurrence of a "1" whenever there is a change in the direction of saturation of the tape 10 and that the produced pulses are both positive and negative going. In line 3d the output of the preamp and full wave rectifier 18 is illustrated. You can see that the negative going pulses in 3c have been rectified so that all the pulses have the same polarity. Line 3e illustrates the output of the summing network 28. In the summing network 28 the pulses are referenced to some preselected level so that their magnitudes will be above or below zero potential depending on whether they are larger or smaller than a preselected desired level.

The pulses shown in 3e are fed into the voltage comparator 26 where in the differential amplifier 30 they are compared with the charge on the capacitor 54 and thereafter employed to charge the capacitor 54 in the manner shown in FIGURE 3f. As illustrated in FIGURE 3f, the charge on the capacitor 54, is initially zero because of the absence of any previous pulses while as previously mentioned the output of the summing circuit 28 is —4 volts. This causes a negative output from the voltage comparator 34 to be fed to the AND gates 36 and 38. However, this does not result in any charging of the capacitor 54 because AND gates 36 and 38 are disabled by the absence of enabling strobe pulses from the peak detector 40. When the first pulse 1 occurs a strobe will be supplied by the peak detector 40 to the inputs of both the positive and negative AND gates 36 and 38. As shown in 3e, pulse 1 is smaller than the desired pulse magnitude and therefore a negative input is applied to the voltage comparator 26 by the summing network 28. This negative input is compared with the zero voltage level on the capacitor 54 to give a negative output to both the +AND gate 36 and the —AND gate 38. Therefore, the negative AND gate 38 is enabled because it has received two negative signals simultaneously, one from the voltage comparator 28 and the other one from the peak detector 44. This biases the transistor 50b in the negative charge source 48 conductive thus sending an increment of negative charge to the capacitor 54. The negative charge results in the ungrounded terminal of the capacitor taking on a negaitve potential as shown at 1 in FIGURE 3f.

The second pulse 2 is larger than the first and therefore the output of the summing network 28 is less negative than at the time of the first pulse. However, the output of the summing network 28 is still more negative than the charge on the capacitor 54 and therefore the output of the voltage comparator 26 is negative. The negative output of the voltage comparator causes the negative charge source 48 to supply an additional increment of negative charge to the storage capacitor 54. The same thing happens when the third pulse occurs and therefore a third increment of negative charge is applied to the storage capacitor 54 by the negative charge source 48. By the time the fourth pulse is applied, the charge on the storage capacitor 54 is more negative than the output of the summing network 28. This means that the output of the summing network 28 is positive with respect to the charge stored on the storage capacitor 54. Therefore, the output of the voltage comparator 26 is positive gating the positive AND gate 36 on in conjunction with a strobe pulse from the peak detector 40. The positive AND gate then biases transistor 50a conductive thus decreasing the magnitude of the negative charge on the capacitor 54 as shown at 4 on FIGURE 3f. The same thing occurs for the fifth and sixth pulses as shown at 5 and 6 of FIGURE 3f dropping the charge on the capacitor 54 to zero by the end of the sixth pulse.

The charge on the capacitor remains at zero until pulse number 7 occurs. Pulse 7 is slightly larger than the bias and therefore the output of the summing network 28 is positive at the time of pulse 7. Since the charge on the capacitor 54 is zero this means the output of the voltage comparator 28 is positive causing +AND gate 36 to gate transistor 50a conductive and thereby raise the charge on the capacitor 54 to some positive level. When the pulse 8 occurs the charge on the capacitor has been raised to this positive level which in this case happens to be equal to the output of the summing network 28 at the time of pulse 8. Therefore there is no output out of the voltage comparator and thus the capacitor remains charged at its positive value until pulse 9 occurs. Pulse 9 is equal to the bias supplied by the reference source 22 and therefore the output of the summing circuit 28 is zero at the time of pulse 9. Since the capacitor in the storage circuit 32 is charged positively, the output of the summing network 28 is less than the charge on the storage capacitor 54 so that the output of the voltage comparator 26 is negative causing negative AND gate 42 to gate on the negative charge source 48 thus decreasing the charge on the capacitor to zero. The charge on the capacitor remains zero until pulse 12 occurs.

Pulses 12 through 19 are all much smaller than the reference voltage and cause the voltage comparator 28 to put out a series of negative pulses which increase the negative charge on the capacitor in a number of increments until charge on the storage capacitor 54 exceeds the reference limit e set by reference 70 thereby causing the lower limit detector 78 to indicate that the tape is out of spec.

Above we have described the peak detector of the present invention being used to determine whether pulses recorded on tape are collectively within desired magnitude limitations. By collectively it is meant that the magnitude of the pulses as a group as opposed to each pulse individually are within the set magnitude limitation. However, the magnitude of individual pulses whether they are recorded on tape or not can be measured against a fixed reference by the disclosed peak detector merely by decreasing the sensitivity of the voltage comparator 26 and reducing the reference voltages supplied to the limit detectors 64 and 66 so that they can detect a single charging of the capacitor 54 by either of the charge sources 46 or 48.

Therefore, while the invention has been particularly shown and described with reference to a preferred embodiment thereof it will be understood by those skilled in the art that the foregoing and other changes in form and detail may be made therein without departing from the spirit and scope of the invention.

What is claimed is:

1. An amplitude detection circuit for detecting the magnitude of input signals comprising:
   (a) reference means for comparing input signals to a preferred signal level to provide referenced signals which differ from a reference level in proportion to the variation in the magnitudes of the input signals from the preferred signal level;
   (b) storage means for storing signal levels;
   (c) comparison means comparing the referenced signals to the level stored on the storage means to provide a difference signal; and
   (d) charge means responsive to the difference signal of the comparison means for changing the level stored on the storage means in a direction tending to decrease the difference between the level stored and the magnitude of the referenced signals whereby the level stored on the storage means is a function of the difference between the input signals and the preferred signal level.

2. The amplitude detection circuit of claim 1 wherein:
   (a) said storage means is a capacitive storage means; and
   (b) said charge means incrementally increases and decreases the charge on the capacitive means to change the level stored in the capacitive means by a fixed amount.

3. The amplitude detection circuit of claim 2 including means for providing an error indication when the level on the capacitive storage means differs by more than a predetermined magnitude from the zero error indication level.

4. An amplitude detection circuit for detecting the magnitude of pulses occurring in input signals to the circuit comprising:
   (a) reference means for comparing the input signals to a preferred signal level to provide referenced signals which differ from a reference level in proportion to the variation in the input signals from the preferred signal level;
   (b) storage means for storing signal levels;
   (c) comparison means for comparing the referenced signals to the level stored on the storage means to provide a difference signal; and
   (d) gated charge means responsive to the difference signal of the comparison means only at the time of the occurrence of a pulse in the input signals to change the level stored in the storage means in a direction tending to decrease said difference signal whereby the level stored on the storage means is a function of the difference between the magnitude of the pulses and the preferred signal level.

5. The amplitude detection circuit of claim 4 wherein said charge means includes:
   (a) a positive and a negative charging means for charging said storage means;
   (b) first gating means responsive to one polarity of said difference signal for gating on said positive charging means only on occurrence of a pulse in said input and a difference signal of said one polarity; and
   (c) second gating means responsive to the other polarity of said difference signal for gating on said negative charging means only on occurrence of a pulse in said input and a difference signal of said other polarity.

6. The amplitude detection circuit of claim 4 wherein:
   (a) both said gates include peak detecting means for providing both a positive and negative output signal upon the occurrence of a pulse in the input;
   (b) the first gating means includes an AND circuit which receives the output of the peak detecting means and the difference signal and provides an output which gates on the positive source upon the receipt of both the output of the peak detecting means and a positive difference signal;
   (c) the second gating means includes an AND circuit which receives the output of the peak detecting means and the difference signal and provides an output which gates on the positive source upon the receipt of both the output of the peak detector and a positive difference signal.

References Cited

UNITED STATES PATENTS

| | | | |
|---|---|---|---|
| 2,840,707 | 6/1958 | Johnson | 328—151 X |
| 3,287,570 | 11/1966 | Wilson | 328—151 X |
| 3,336,518 | 8/1967 | Murphy | 320—1 |
| 3,375,501 | 3/1968 | McCutcheon et al. | 320—1 X |
| 3,390,381 | 6/1968 | Shepard | 340—173 |
| 3,392,372 | 7/1968 | Rosener | 340—146.1 |

BERNARD KONICK, Primary Examiner

J. F. BREIMAYER, Assistant Examiner

U.S. Cl. X.R.

340—173, 174.1; 328—151; 307—235